(12) United States Patent
Chuang et al.

(10) Patent No.: US 9,313,389 B2
(45) Date of Patent: Apr. 12, 2016

(54) CAMERA ASSEMBLY AND ELECTRONIC DEVICE

(71) Applicant: HTC Corporation, Taoyuan County (TW)

(72) Inventors: I-Cheng Chuang, Taoyuan County (TW); Hung-Wen Lin, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 84 days.

(21) Appl. No.: 14/074,722

(22) Filed: Nov. 8, 2013

(65) Prior Publication Data

US 2015/0130974 A1    May 14, 2015

(51) Int. Cl.
*H04N 5/225*    (2006.01)

(52) U.S. Cl.
CPC ........... *H04N 5/2257* (2013.01); *H04N 5/2252* (2013.01); *H04N 5/2258* (2013.01)

(58) Field of Classification Search
CPC . H04N 5/2257; H04N 5/2258; H04N 5/2253; H04N 5/2252
USPC .................................................. 348/372–374
See application file for complete search history.

(56) References Cited

U.S. PATENT DOCUMENTS

| | | | |
|---|---|---|---|
| 7,619,683 B2 * | 11/2009 | Davis | 348/374 |
| 7,693,540 B2 | 4/2010 | Kim | |
| 2007/0047952 A1 * | 3/2007 | Kim et al. | 396/542 |
| 2010/0245661 A1 * | 9/2010 | Kim et al. | 348/374 |
| 2011/0150462 A1 * | 6/2011 | Chiu et al. | 396/542 |

FOREIGN PATENT DOCUMENTS

| | | |
|---|---|---|
| CN | 101493634 | 7/2009 |
| TW | 200835312 | 8/2008 |
| TW | 201106837 | 2/2011 |

OTHER PUBLICATIONS

"Office Action of Taiwan Counterpart Application", issued on Nov. 25, 2014, p. 1-p. 8.

* cited by examiner

*Primary Examiner* — Hung Lam
(74) *Attorney, Agent, or Firm* — Jianq Chyun IP Office

(57) ABSTRACT

A camera assembly, including at least one holder, at least one camera module, and a buffer material, is provided. The holder includes at least one accommodating recess. The camera module is disposed in the accommodating recess, and a gap exists between the camera module and a sidewall of the accommodating recess. The buffer material is filled in the gap to position the camera module in the accommodating recess of the holder. Further, an electronic device including a housing and the camera assembly aforementioned is provided.

17 Claims, 4 Drawing Sheets

CAMERA ASSEMBLY AND ELECTRONIC DEVICE

BACKGROUND OF THE APPLICATION

1. Field of the Application

The application relates to a camera assembly and particularly relates to a camera assembly and an electronic device utilizing the camera assembly.

2. Description of Related Art

As the technology industries develop in recent years, portable electronic devices, such as smart phone, tablet computer, or notebook computer, are used frequently in our daily life. The styles and functions of portable electronic devices are becoming more and more diverse. Because of convenience and practicality, portable electronic devices become more popular and can be used for different purposes.

In addition to the inherent functions, portable electronic devices are usually provided with additional functional components, so that the electronic devices have other functions. For example, a portable electronic device may be equipped with a camera module to acquire images through a photosensitive component in the camera module. For the portable electronic device equipped with a camera module, however, an optical axis offset of the lens of the camera module may occur due to dropping or impacting of the portable electronic device or other external forces, which affects the quality of image of the camera module.

SUMMARY OF THE APPLICATION

The application provides a camera assembly with favorable operating stability.

The application provides an electronic device with favorable operating stability.

A camera assembly of the application includes at least one holder, at least one camera module, and a buffer material. The holder includes at least one accommodating recess. The camera module is disposed in the accommodating recess, and a gap exists between the camera module and a sidewall of the accommodating recess. The buffer material is filled in the gap to position the camera module in the accommodating recess of the holder.

An electronic device of the application includes a housing and a camera assembly. The camera assembly is disposed in the housing and is exposed by at least one hole on the housing. The camera assembly includes at least one holder, at least one camera module, and a buffer material. The holder includes at least one accommodating recess. The camera module is disposed in the accommodating recess, and a gap exists between the camera module and a sidewall of the accommodating recess. The buffer material is filled in the gap to position the camera module in the accommodating recess of the holder.

Based on the above, in the camera assembly of the application, the camera module is disposed in the accommodating recess of the holder, and the gap between the camera module and the sidewall of the accommodating recess is filled with the buffer material. By filling the gap with the buffer material, the optic axis offset of the lens of the camera module due to dropping or impacting of the electronic device or due to an external force thereon is mitigated.

To make the aforementioned and other features and advantages of the application more comprehensible, several embodiments accompanied with drawings are described in detail as follows.

BRIEF DESCRIPTION OF THE DRAWINGS

The accompanying drawings are included to provide a further understanding of the application, and are incorporated in and constitute a part of this specification. The drawings illustrate exemplary embodiments of the application and, together with the description, serve to explain the principles of the application.

DESCRIPTION OF THE EMBODIMENTS

Figure 1:
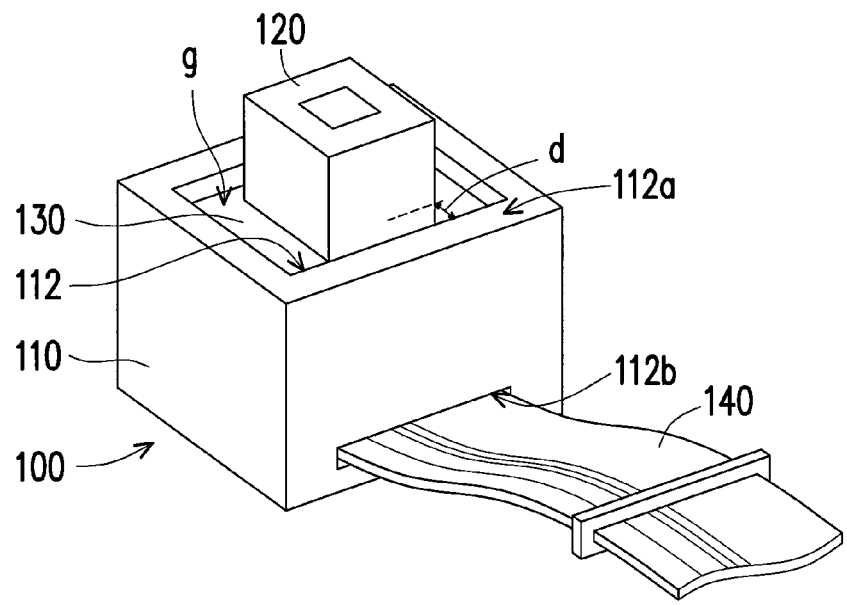
FIG. 1 is a schematic view of a camera assembly according to an embodiment of the invention.
Figure 4:
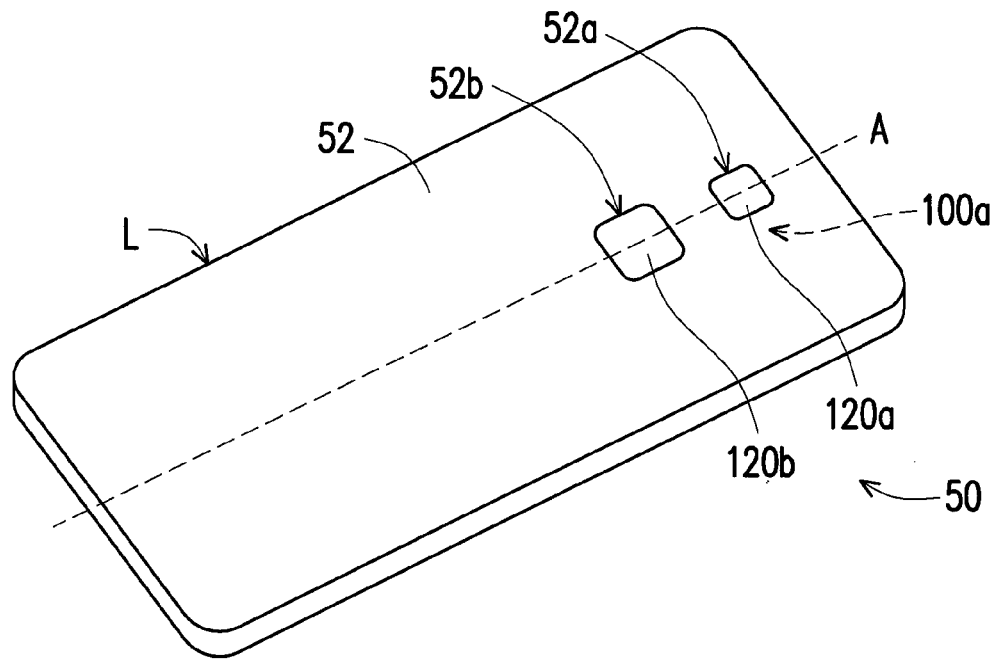
FIG. 4 is a schematic view of an electronic device according to an embodiment of the invention.

FIG. 1 is a schematic view of a camera assembly according to an embodiment of the invention. Referring to FIG. 1, in this embodiment, the camera assembly 100 includes a holder 110, a camera module 120, and a buffer material 130. The holder 110 includes an accommodating recess 112. The camera module 120 is disposed in the accommodating recess 112, and a gap g exists between the camera module 120 and a sidewall 112a of the accommodating recess 112. The buffer material 130 is filled in the gap g to position the camera module 120 in the accommodating recess 112 of the holder 110. By filling the buffer material 130 in the gap g, an optical axis offset that may occur to a lens of the camera module 120 due to dropping or impacting of the camera assembly 100 or an electronic device 50 utilizing the camera assembly 100 (as shown in FIG. 4), or due to an external force thereon may be mitigated.

More specifically, in this embodiment, a Young's modulus of the buffer material 130 is lower than a Young's modulus of the holder 110. In other words, a material that has a higher Young's modulus may be used as a material of the holder 110. The material of the holder 110 is metal, ceramics, or plastic, for example, wherein the metal may be selected from stainless steel, aluminum alloy (Al alloy), copper alloy (Cu alloy), zirconium alloy (Zr alloy), titanium alloy (Ti alloy), zinc alloy (Zn alloy), magnesium alloy (Mg alloy), or lithium alloy (Li alloy). The ceramics may be aluminum oxide, aluminum nitride, silicon oxide, silicon nitride, zirconium oxide, boron nitride, or silicon carbide. To be more specific, because the holder 110 has higher Young's modulus, the holder 110 does not deform easily. The buffer material 130 has elasticity and flexibility for absorbing impact, which may be resin, silicon rubber, polyamide (PA), polyurethane (PU), poly propylene (PP), or rubber. Therefore, the buffer material 130 has shock-suppressing and shock-absorbing functions for mitigating impact. Even if the camera assembly 100 or the electronic device 50 (as shown in FIG. 4) is dropped, impacted, or affected by an external force, the optical axis offset that may occur to the lens of the camera module 120 is mitigated. This application is not intended to limit the materials of the holder 110 and the buffer material 130, which may be varied as required.

Because the holder 110 with high Young's modulus is used in combination with the buffer material 130 with low Young's modulus, when the camera assembly 100 is dropped, impacted, or affected by an external force, the holder 110 protects the integrity of the camera module 120, and the buffer material 130 mitigates the optical axis offset of the lens of the camera module 120. Preferably, a distance is maintained between all sidewalls 112a (in FIG. 1, the accommodating recess 112 has four sidewalls 112a, for example) of the accommodating recess 112 and the camera module 120. That is, the camera module 120 of this embodiment is not in contact with the sidewalls 112a of the accommodating recess 112. Thus, after filling the buffer material 130 in the gap g, the optical axis offset of the lens of the camera module 120 due to dropping or impacting of the camera module 120 or due to an external force thereon may be mitigated. In this embodiment, a shortest distance d between the camera module 120 and an inner surface of the sidewall 112a of the accommodating recess 112 may be 0.8 mm (millimeter); however, the application is not limited thereto. The shortest distance d may be adjusted as required.

In addition, in this embodiment, the camera assembly 100 further includes a flexible circuit board 140. The flexible circuit board 140 is connected to the camera module 120, and the sidewall 112a of the accommodating recess 112 has an opening 112b. The flexible circuit board 140 extends outside the holder 110 through the opening 112b. In other words, an end of the flexible circuit board 140 is disposed in the accommodating recess 112 and the other end thereof extends outside the holder 110 through the opening 112b on the sidewall 112a of the accommodating recess 112. However, in other embodiments, the opening 112b may be formed at a bottom of the accommodating recess 112, allowing the flexible circuit board 140 to extend outside the holder 110. However, it is noted that the application is not intended to limit the position of the opening 112b. Accordingly, the camera module 120 disposed in the accommodating recess 112 is electrically connected with the flexible circuit board 140 and then electrically connected to an internal body of the electronic device 50 (as shown in FIG. 4) through the flexible circuit board 140, wherein the electronic device 50 may be a smart phone, a tablet computer, or a notebook computer, for example. In addition, the camera assembly 100 may be fixed on an internal chassis (not shown) in the electronic device 50 by the holder 110 and electrically connected to a body (not shown) in the electronic device 50 through the flexible circuit board 140, such that the electronic device 50 has a camera function.

Figure 2:
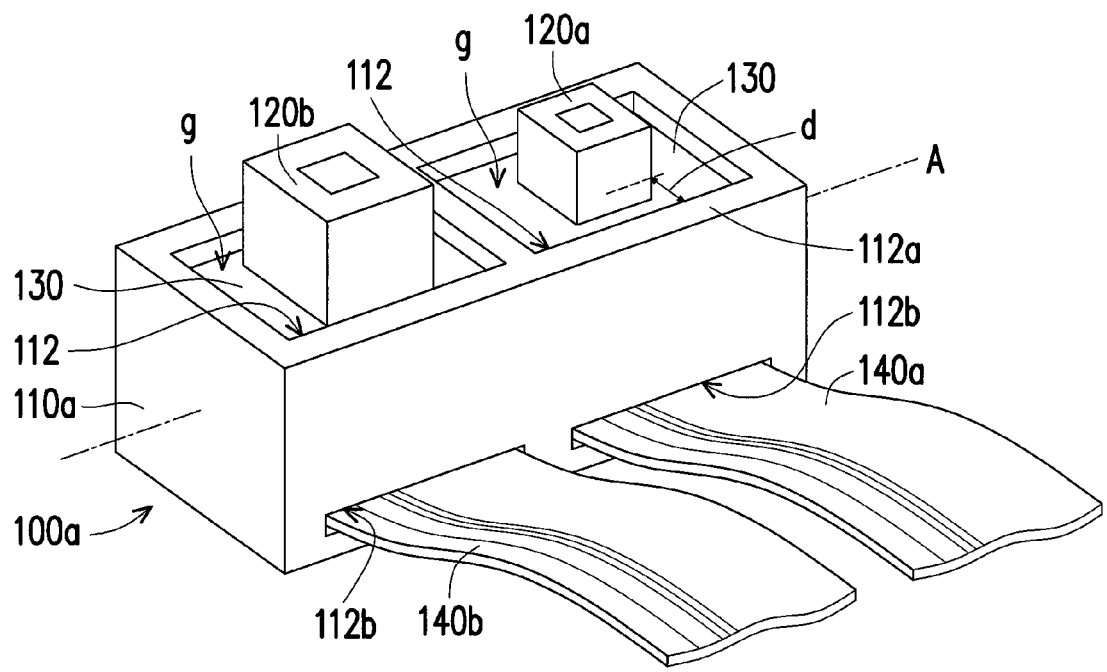
FIG. 2 is a schematic view of a camera assembly according to another embodiment of the invention.

FIG. 2 is a schematic view of a camera assembly according to another embodiment of the invention. With reference to FIG. 2, in this embodiment, a main difference between a camera assembly 100a and the camera assembly 100 lies in that the number of the camera modules of the camera assembly 100a is two, and the number of the accommodating recesses 112 is two as well. More specifically, in this embodiment, a holder 110a includes two accommodating recesses 112. Two camera modules 120a and 120b are respectively disposed in the two accommodating recesses 112, and the gap g respectively exists between the camera modules 120a and 120b and the sidewalls 112a of the corresponding accommodating recesses 112. The buffer material 130 is filled in the gap g. Material properties of the holder 110a and the buffer material 130 and relative positions of the holder 110a and the camera modules 120a and 120b have been described above and thus are not repeated hereinafter. Thus, after filling the buffer material 130 in the gap g, the optical axis offsets of the lenses of the camera modules 120a and 120b due to dropping, impacting, or an external force may be mitigated. In addition, the two camera modules 120a and 120b of this embodiment are preferably disposed symmetrically with an axis A as a center line. Furthermore, the two camera modules 120a and 120b of this embodiment have different pixel numbers. For example, the camera module 120a may have 1.3M or 2.1M pixels and have a smaller size in appearance. The camera module 120b may have 8M, 13M, or 18M pixels and have a larger size in appearance. When the camera assembly 100a is applied to the electronic device 50 (as shown in FIG. 4), the camera assembly 100a is able to acquire more image data through the two camera modules 120a and 120b that have different pixel numbers for subsequent image processing and various applications.

For example, when the camera assembly 100a is applied to the electronic device 50, one of the camera modules, e.g. the camera module 120b, may be used as a main camera module, and the other one, e.g. the camera module 120a, may be used as an auxiliary camera module for improving a focus speed of the camera module 120b. In addition, because the camera module 120a and the camera module 120b are disposed in the same holder 110a, a distance between the camera module 120a and the camera module 120b may be maintained at a fixed value. Moreover, the buffer material 130 is disposed to maintain stability of the optic axes of the lenses of the camera modules 120a and 120b. Therefore, the camera assembly 100a of this embodiment is provided with two camera modules 120a and 120b to acquire more image data for subsequent image processing and various applications. For instance, the image data may be a distance between each object in an image and the camera modules 120a and 120b. However, in other embodiments not illustrated here, the pixel numbers of the two camera modules 120a and 120b of the camera assembly 100a may be varied as required. The two camera modules 120a and 120b may have the same pixel number. Nevertheless, the application is not limited thereto.

In this embodiment, the camera assembly 100a further includes flexible circuit boards 140a and 140b. The flexible circuit boards 140a and 140b are respectively connected to the camera modules 120a and 120b, and the sidewalls 112a of the accommodating recesses 112 respectively have openings 112b. The flexible circuit boards 140a and 140b respectively extend outside the holder 110a through the corresponding openings 112b. In other words, one end of each of the flexible circuit boards 140a and 140b is disposed in the corresponding accommodating recess 112, and the other end of each of the flexible circuit boards 140a and 140b extends outside the holder 110a through the opening 112b on the sidewall 112a, so as to electrically connect the two camera modules 120a and 120b to the body of the electronic device 50. However, the application does not limit the position of the opening 112b. The opening 112b may also be formed at the bottom of the accommodating recesses 112. Furthermore, in other embodiments not disclosed here, the camera assembly may be provided with one single accommodating recess 112, and the two camera modules 120a and 120b are both disposed in the accommodating recess 112. The application does not limit the number of the accommodating recesses 112.

Figure 3:
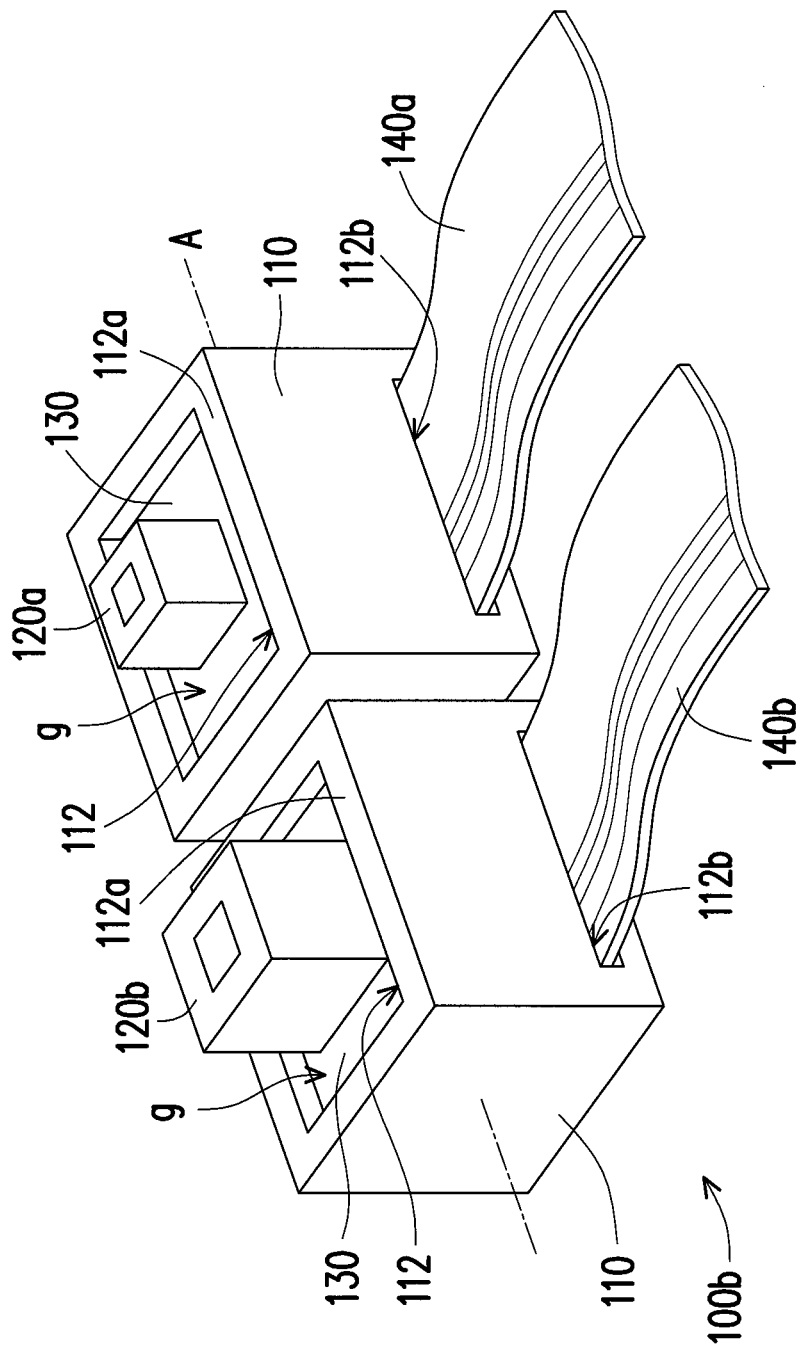
FIG. 3 is a schematic view of a camera assembly according to yet another embodiment of the invention.

FIG. 3 is a schematic view of a camera assembly according to yet another embodiment of the invention. With reference to FIG. 3, in this embodiment, a camera assembly 100b includes two camera modules 120a and 120b like the camera assembly 100a, and a main difference lies in that the camera assembly 100b includes two holders 110. More specifically, in this embodiment, the camera assembly 100b has two holders 110, and each of the holders 110 has one accommodating recess 112. The two camera modules 120a and 120b are respectively disposed in the accommodating recesses 112 of the corresponding holders 110, and the gap g respectively exists between the camera modules 120a and 120b and the sidewalls 112a of the corresponding accommodating recesses 112. The buffer material 130 is filled in the gap g. Material properties of the holders 110 and the buffer material 130 and relative positions of the holders 110 and the corresponding camera modules 120a and 120b have been described above and thus are not repeated hereinafter. After filling the buffer material 130 in the gap g, optical axis offsets of the lenses of the camera modules 120a and 120b due to dropping or other reasons may be mitigated. Likewise, the two camera modules 120a and 120b of this embodiment are preferably disposed symmetrically with the axis A as the center line. Furthermore, the two camera modules 120a and 120b of this embodiment have different pixel numbers. Thus, when the camera assembly 100b is applied to the electronic device 50 (as shown in FIG. 4), the camera assembly 100b is able to acquire more image data through the two camera modules 120a and 120b that have different pixel numbers for subsequent image processing and various applications. For example, the auxiliary camera module (e.g. the camera module 120a) is used to assist the focus speed of the main camera module (e.g. the camera module 120b). For instance, the image data may be the distance between each object in the image and the camera module 120b. Accordingly, the camera assembly 100b of this embodiment has various applications.

Similarly, in this embodiment, the camera assembly 100b further includes flexible circuit boards 140a and 140b. The connection between the flexible circuit boards 140a and 140b and the respective camera modules 120a and 120b has been described above and thus are not repeated hereinafter. Accordingly, the camera assembly 100b may be electrically connected to the body of the electronic device 50 through the flexible circuit boards 140a and 140b.

Figure 5:
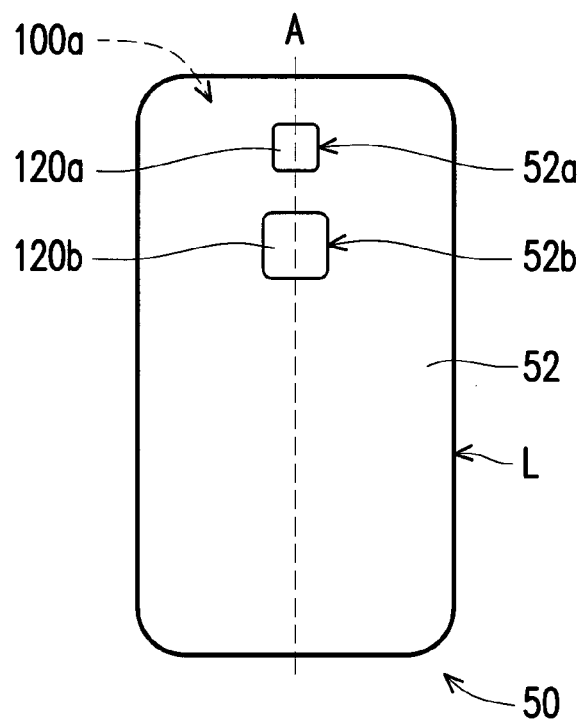
FIG. 5 is a schematic rear view of the electronic device of FIG. 4.
Figure 6:
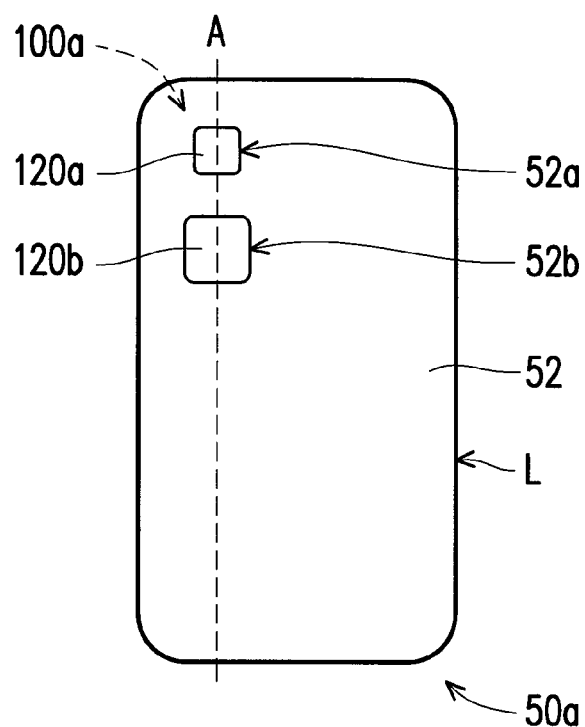
FIG. 6 and FIG. 7 are schematic rear views of electronic devices according to other embodiments of the invention.
Figure 7:
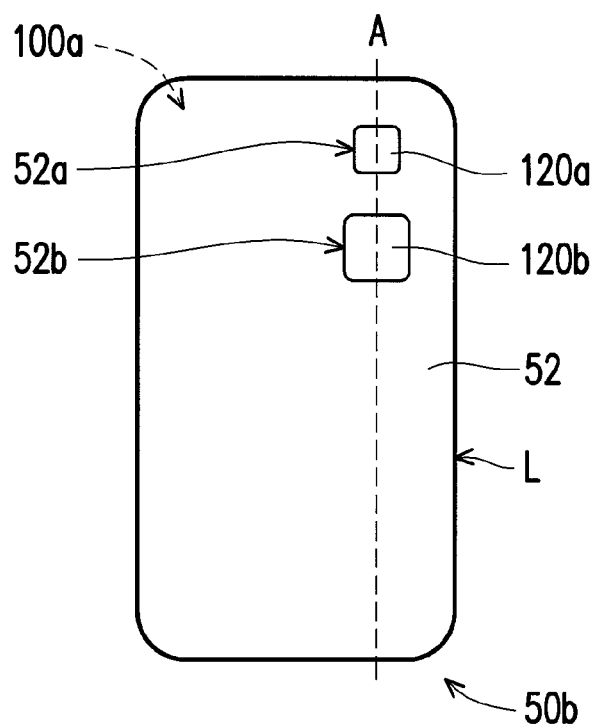

FIG. 4 is a schematic view of an electronic device according to an embodiment of the invention. FIG. 5 is a schematic rear view of the electronic device of FIG. 4. FIG. 6 and FIG. 7 are schematic rear views of electronic devices according to other embodiments of the invention. First, with reference to FIG. 4 to FIG. 5, in this embodiment, the electronic device 50 includes a housing 52 and the camera assembly 100a. The camera assembly 100a is disposed in the housing 52 and is exposed by two holes 52a and 52b on the housing 52. Please refer to the above descriptions for details of the camera assembly 100a, wherein the holder 110a of the camera assembly 100a is fixed on the internal chassis (not shown) in the electronic device 50, and the flexible circuit board 140 is connected to the body (not shown) in the electronic device 50, thereby electrically connecting the two camera modules 120a and 120b to the body through the flexible circuit board 140a and 140b. Moreover, the camera modules 120a and 120b are respectively exposed by the two corresponding holes 52a and 52b on the housing 52. Accordingly, the housing 52 of the electronic device 50 covers most components of the camera assembly 100a and exposes the two camera modules 120a and 120b through the holes 52a and 52b so as to prevent affecting the camera functions of the two camera modules 120a and 120b. Because the gaps g between the camera modules 120a and 120b and the sidewalls 112a of the corresponding accommodating recesses 112 are filled with the buffer material 130, optical axis offsets of the lenses of the camera modules 120a and 120b due to dropping, impacting, or an external force may be mitigated.

In this embodiment, the two camera modules 120a and 120b are disposed symmetrically with the axis A as the center line. Preferably, the axis A is parallel to a long side L of the housing 52, as shown in FIG. 4 and FIG. 5. In other words, the two camera modules 120a and 120b are arranged along the axis A and parallel to the long side L, and the camera modules 120a and 120b are disposed symmetrically with the axis A as the center line. Here, the camera assembly 100a is disposed corresponding to the center line of the housing 52, for example, but the application is not limited thereto. In the embodiments of FIG. 6 and FIG. 7, the camera assemblies 100a of an electronic device 50a and an electronic device 50b may respectively correspond to two opposite long sides L of the housing 52 and still achieve the aforementioned effects. Thus, the application does not limit the position of the camera assembly 100a, which may be varied as required.

To sum up, in the camera assembly of the application, the camera module is disposed in the accommodating recess of the holder, and the gap between the camera module and the sidewall of the accommodating recess is filled with the buffer material. By filling the gap with the buffer material, the optical axis offset of the lens of the camera module due to dropping or impacting of the camera assembly or the electronic device or due to an external force thereon is mitigated to maintain the image quality. In addition, when the camera assembly is applied to the electronic device, the camera assembly is able to acquire more image data through two camera modules that have different pixel numbers for subsequent image processing and various applications.

It will be apparent to those skilled in the art that various modifications and variations can be made to the disclosed embodiments without departing from the scope or spirit of the application. In view of the foregoing, it is intended that the application covers modifications and variations of this disclosure provided that they fall within the scope of the following claims and their equivalents.

What is claimed is:

1. A camera assembly, comprising:
   at least one holder comprising at least one accommodating recess;
   at least one camera module disposed in the accommodating recess, wherein a gap exists between the camera module and a sidewall of the accommodating recess; and
   a buffer material filled in the gap to position the camera module in the accommodating recess of the holder, and the camera module is not in contact with the sidewall of accommodating recess.

2. The camera assembly according to claim 1, wherein a Young's modulus of the buffer material is lower than a Young's modulus of the holder.

3. The camera assembly according to claim 1, wherein a shortest distance between the camera module and an inner surface of the sidewall of the accommodating recess is 0.8 mm.

4. The camera assembly according to claim 1, wherein the number of the at least one camera module is two, and the two camera modules are arranged symmetrically with an axis as a center line.

5. The camera assembly according to claim 4, wherein the number of the at least one accommodating recess is two, and the two camera modules are respectively disposed in the two accommodating recesses, wherein the gap exists respectively between each of the camera modules and the sidewall of the corresponding accommodating recess and is filled with the buffer material.

6. The camera assembly according to claim 4, wherein the number of the at least one holder is two, and the two camera modules are respectively disposed in the accommodating recesses of the corresponding holders, wherein the gap exists respectively between each of the camera modules and the sidewall of the corresponding accommodating recess and is filled with the buffer material.

7. The camera assembly according to claim 4, wherein the two camera modules have different pixel numbers.

8. The camera assembly according to claim 1, further comprising:
   a flexible circuit board connected to the camera module, wherein the sidewall of the accommodating recess comprises an opening through which the flexible circuit board extends outside the holder.

9. An electronic device, comprising:
a housing; and
a camera assembly disposed in the housing and exposed by at least one hole on the housing, wherein the camera assembly comprises:
   at least one holder comprising at least one accommodating recess;
   at least one camera module disposed in the accommodating recess, wherein a gap exists between the camera module and a sidewall of the accommodating recess; and
   a buffer material filled in the gap to position the camera module in the accommodating recess of the holder, and the camera module is not in contact with the sidewall of the accommodating recess.

10. The electronic device according to claim 9, wherein a Young's modulus of the buffer material is lower than a Young's modulus of the holder.

11. The electronic device according to claim 9, wherein a shortest distance between the camera module and an inner surface of the sidewall of the accommodating recess is 0.8 mm.

12. The electronic device according to claim 9, wherein the number of the at least one camera module is two, and the two camera modules are arranged symmetrically with an axis as a center line.

13. The electronic device according to claim 12, wherein the axis is parallel to a long side of the housing.

14. The electronic device according to claim 12, wherein the number of the at least one accommodating recess is two, and the two camera modules are respectively disposed in the two accommodating recesses, wherein the gap exists respectively between each of the camera modules and the sidewall of the corresponding accommodating recess and is filled with the buffer material.

15. The electronic device according to claim 12, wherein the number of the at least one holder is two, and the two camera modules are respectively disposed in the accommodating recesses of the corresponding holders, wherein the gap exists respectively between each of the camera modules and the sidewall of the corresponding accommodating recess and is filled with the buffer material.

16. The electronic device according to claim 12, wherein the two camera modules have different pixel numbers.

17. The electronic device according to claim 9, wherein the camera assembly further comprises:
   a flexible circuit board connected to the camera module, wherein the sidewall of the accommodating recess comprises an opening through which the flexible circuit board extends outside the holder.

* * * * *